US012772060B2

(12) United States Patent
Kann et al.

(10) Patent No.: US 12,772,060 B2
(45) Date of Patent: Oct. 20, 2026

(54) NETWORKED DEVICE CONFIGURED TO DETECT SIGNAL BLOCKAGE AND TAMPERING

(71) Applicant: Itron, Inc., Liberty Lake, WA (US)

(72) Inventors: James Lee Kann, Mica, WA (US); Mark K. Cornwall, Spokane, WA (US)

( * ) Notice: Subject to any disclaimer, the term of this patent is extended or adjusted under 35 U.S.C. 154(b) by 161 days.

(21) Appl. No.: 18/923,486

(22) Filed: Oct. 22, 2024

(65) Prior Publication Data

US 2026/0113638 A1 Apr. 23, 2026

(51) Int. Cl.
*H04W 12/12* (2021.01)
*H04W 12/121* (2021.01)

(52) U.S. Cl.
CPC .................................. *H04W 12/121* (2021.01)

(58) Field of Classification Search
CPC .................................................... H04W 12/121
USPC ........................................................... 340/637
See application file for complete search history.

(56) References Cited

U.S. PATENT DOCUMENTS

| | | | | |
|---|---|---|---|---|
| 6,118,269 | A * | 9/2000 | Davis | G06F 21/86 340/637 |
| 8,054,199 | B2 | 11/2011 | Addy | |
| 10,509,061 | B2 | 12/2019 | Brown | |
| 11,418,932 | B2 | 8/2022 | Hamilton | |
| 11,816,600 | B1 | 11/2023 | Cope et al. | |
| 11,971,291 | B2 | 4/2024 | Cornwall et al. | |
| 11,982,373 | B2 | 5/2024 | Kann et al. | |
| 2009/0243866 | A1* | 10/2009 | Murphy | G06Q 50/06 340/637 |
| 2018/0291911 | A1* | 10/2018 | Ward | F04F 5/10 |
| 2019/0353156 | A1* | 11/2019 | Ward | F04B 49/065 |
| 2023/0041634 | A1* | 2/2023 | Iliev | G01F 15/007 |
| 2024/0083285 | A1* | 3/2024 | Trigoso Papoila | B60L 53/305 |
| 2026/0126478 | A1* | 5/2026 | Teboulle | G01R 22/066 |

FOREIGN PATENT DOCUMENTS

| | | |
|---|---|---|
| CN | 113198821 A | 8/2021 |
| CN | 220603569 U | 3/2024 |

OTHER PUBLICATIONS

Search Report and Written Opinion for International Application No. PCT/US25/46085, dated Jan. 2, 2026, 31 pages.

* cited by examiner

*Primary Examiner* — Travis R Hunnings
(74) *Attorney, Agent, or Firm* — Lee & Hayes, P.C.

(57) ABSTRACT

Techniques for detecting blockage of a utility meter or other networked device are described. The blockage may be natural, e.g., snow, ice, and/or biomass. The blockage (e.g., aluminum foil) may be an intentional attempt to tamper with the device. In both cases, the blockage material may interfere with radio frequency (RF) communications of the networked device with other devices on a network. For example, snow, ice, biomass, and/or aluminum foil may prevent a networked utility device (e.g., a metering device) from reporting consumption data to a data-collecting device. Blockage may be detected based at least in part on the use of optical sensors and/or RF sensors. In one example, an out-going optical signal (e.g., infrared light) may be reflected off blockage material and the reflection may be received and processed. In a further example, an in-coming RF signal may be attenuated and/or frequency-shifted thereby revealing aspects about the blockage material.

26 Claims, 13 Drawing Sheets

NETWORKED DEVICE CONFIGURED TO DETECT SIGNAL BLOCKAGE AND TAMPERING

BACKGROUND

Snow, ice, vegetation, and debris covering networked devices—such as utility meters—can cause multiple issues, such as the prevention of visual meter reading, radio frequency (RF) signal blockage, the cost of debris removal, and other costs. In addition to natural coverings like snow, customer-made coverings—such as aluminum foil—are used in some tampering schemes to block RF communications of the utility meter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

The disclosure describes techniques for detecting blockage of a utility meter or other networked device. The blockage may be natural, e.g., snow, ice, and/or biomass. In some cases, the blockage may be an intentional attempt to tamper with the device, e.g., aluminum foil may be used to cover the meter and impede radio communications. In both cases, the blockage material may interfere with radio frequency (RF) communications of the networked device with other devices on a network. Such devices may include data collectors, consumption metering devices, network repeaters, proprietary network devices, cellular networks, etc. For example, snow, ice, biomass, and/or aluminum foil may prevent a networked utility device (e.g., a metering device) from reporting utility consumption data to a data-collecting device.

Blockage may be detected by optical sensors and/or RF sensors. In one example, an out-going optical signal (e.g., infrared light) may be reflected off blockage material and received by a sensor for processing. In a second example, attenuation and/or frequency-shift of an in-coming radio frequency (RF) signal may indicate the presence of snow, ice, biomass, and/or debris, and/or a thickness of such materials.

In one example, the techniques allow "slow events," like snow or ice buildup, to be distinguished from "fast events" like tampering of the networked device by rapidly applying aluminum foil. In another example, the techniques respond to the detection of blockage with: an increase in a rate of sensor measurements; and/or, an adjustment of the timing of message transmissions. For example, if blockage appears to be accumulating (e.g., the snow and/or ice is getting thicker) then transmissions reporting these conditions may be prioritized and/or data transmissions (e.g., utility consumption data) may be sent earlier than would otherwise be the case, or delayed until the blockage material is removed.

Example System and Techniques

Figure 1:
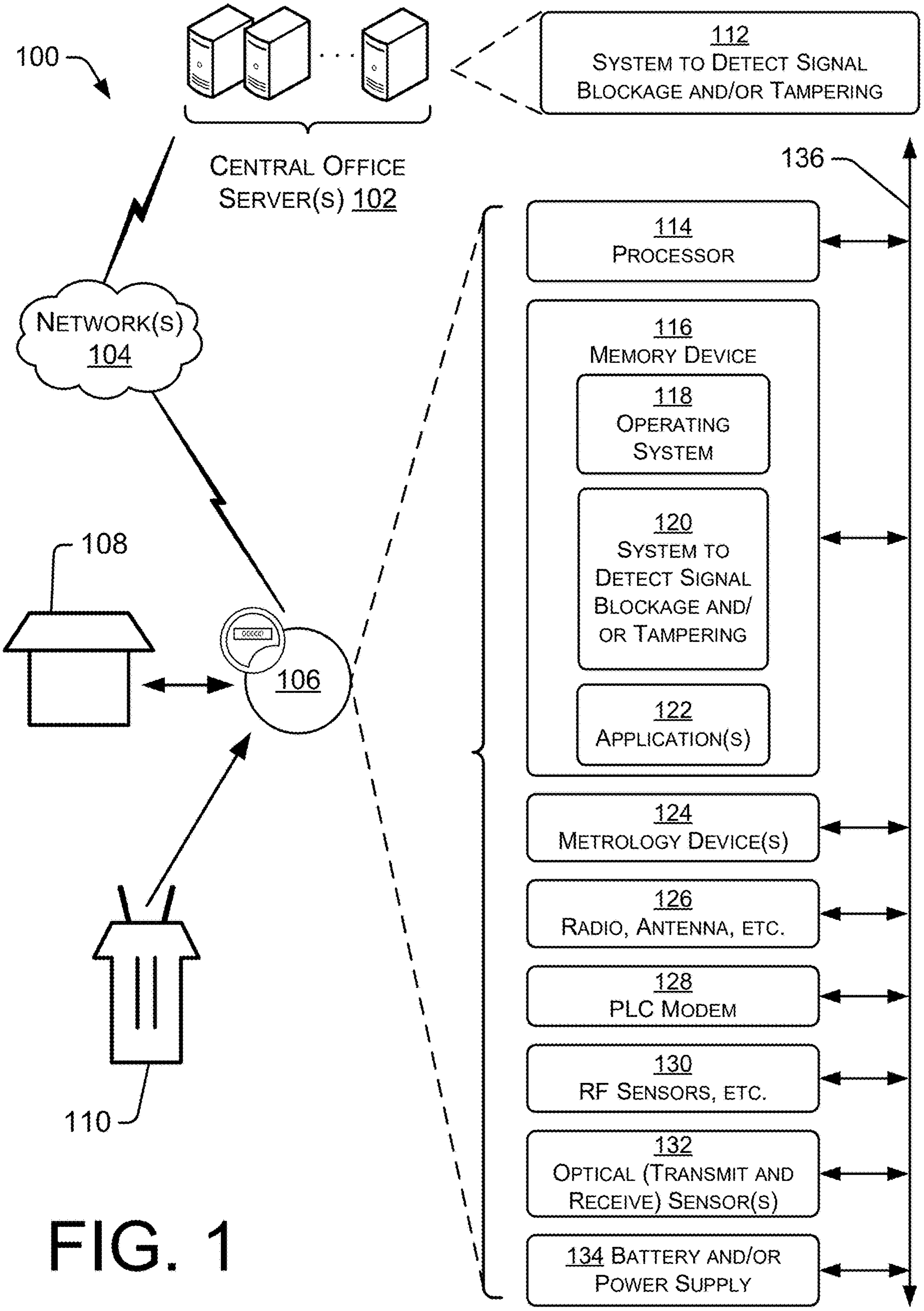
FIG. 1 is a block diagram showing an example of utility system within which network device(s) detect signal blockage and tampering.

FIG. 1 shows aspects of an example electricity grid 100, and shows an example implementation of a system, method, and associated devices and techniques to detect signal blockage and device tampering. While an electricity grid 100 is utilized as an example environment wherein the system, method, and associated techniques are conveniently described, the techniques are also adaptable for use in a water delivery system, a natural gas delivery system, and/or other systems having a plurality of networked devices.

The system, method, and associated techniques to detect signal blockage and tampering may be implemented either at the meter level, at the electricity company server level, and/or at the "cloud" level. The example electricity grid 100 includes central office (e.g., cloud) computers and/or server(s) 102 and communications networks 104. The communications networks 104 may include one or more of the internet, utility company proprietary network(s) using radio, powerline communications (PLC), mesh networks, star networks, etc.

A utility meter 106 serves a customer site 108, and is representative of many such meters and sites, which may number in the thousands or hundreds of thousands. In the example shown, the meter 106 is a smart meter and is in communication with the central office server(s) 102 through the network 104. A transformer 110 is configured to serve one or more customers, and provides low voltage service to the meter 106. The transformer 110 is representative of many such transformers, which may number in the thousands or hundreds of thousands throughout the electricity grid 100.

A system, method, and associated techniques to detect signal blockage and tampering may be located on the central office server 102, or on the smart utility meter 106. For purposes of illustration, FIG. 1 shows both examples, wherein the system 112 is located on the central office server 102, and wherein the system 120 is located on the smart utility meter 106. In some examples, the system 112 may include some of the functionality of an overall system, while the system 120 may include the remainder of the functionality. In an example, portions of the system operational on the servers 102 may record information regarding blockage at different customer sites and manage remedial responses to the blockage. In the example, the portions of the system 120 operational on the utility meter may perform actions related to optical and/or RF signal processing, blockage detection, distinguishing blockage from tampering, etc.

In the example shown, the smart utility meter 106 includes a processor 114 and memory device 116. The memory device 116 may include software programs, that when executed by the processor 114, perform useful functions. In the example of FIG. 1, software applications are shown, including an operating system 118, the system 120 to detect signal blockage and tampering, and one or more software applications 122, drivers, utilities, etc.

The smart meter 106 may include metrology device(s) 124, which may measure consumption of a commodity, such as electricity, natural gas, or water. The examples discussed here describe systems 112 and 120 that are directed to electricity. However, corresponding systems could be constructed for use with natural gas and/or water. Accordingly, the techniques described herein—while they may be explained from the perspective and terminology of electricity—are applicable to any measured commodity, as well as other industries and the internet of things.

The smart meter 106 may include a radio 126, along with one or more antennas. The radio may communicate with radios of other smart meters, a cellular network, the network(s) 104, etc. A power line communications (PLC) modem 128 may be used for communication with other smart meters, particularly meters that are on the same transformer. One or more radio frequency (RF) sensors 130 and/or receivers may be configured to sense the buildup of snow, ice, and/or other debris. Optical sensors 132 may be configured with a transmitter and a receiver, and may be used to detect blockage (e.g., snow and ice) covering all or part of the smart meter. The smart meter 106 may also include a battery and/or a power supply 134. In the example of a system configured as an electricity grid, a battery is not required. A power supply 134 may be configured to provide regulated direct current (DC) power at prescribed voltage levels for operation of the processor 114, the memory device 116, the radio 126 or PLC modem 128, and/or other devices.

A bus, printed circuit board, wiring harness, and/or other circuit connectivity device(s) 136 may be used to connect the processor 114, the memory device 116, the metrology devices 124, the radio 126, PLC modem 128, RF sensors 130, optical sensors 132, the power supply 134, and/or other devices. The circuit connectivity device(s) 136 may conduct electrical power and/or data.

While FIG. 1 shows the use of a smart metering device 106 and the system 120 to detect signal blockage and/or tampering, alternatively or additionally, a solar battery access point (SBAP) device which could employ an RF method of detecting blockage and use a variation of system 120. Accordingly, the system 120 is extensible to other devices based on availability, design requirements, etc.

Example Networked Device

Figure 2:
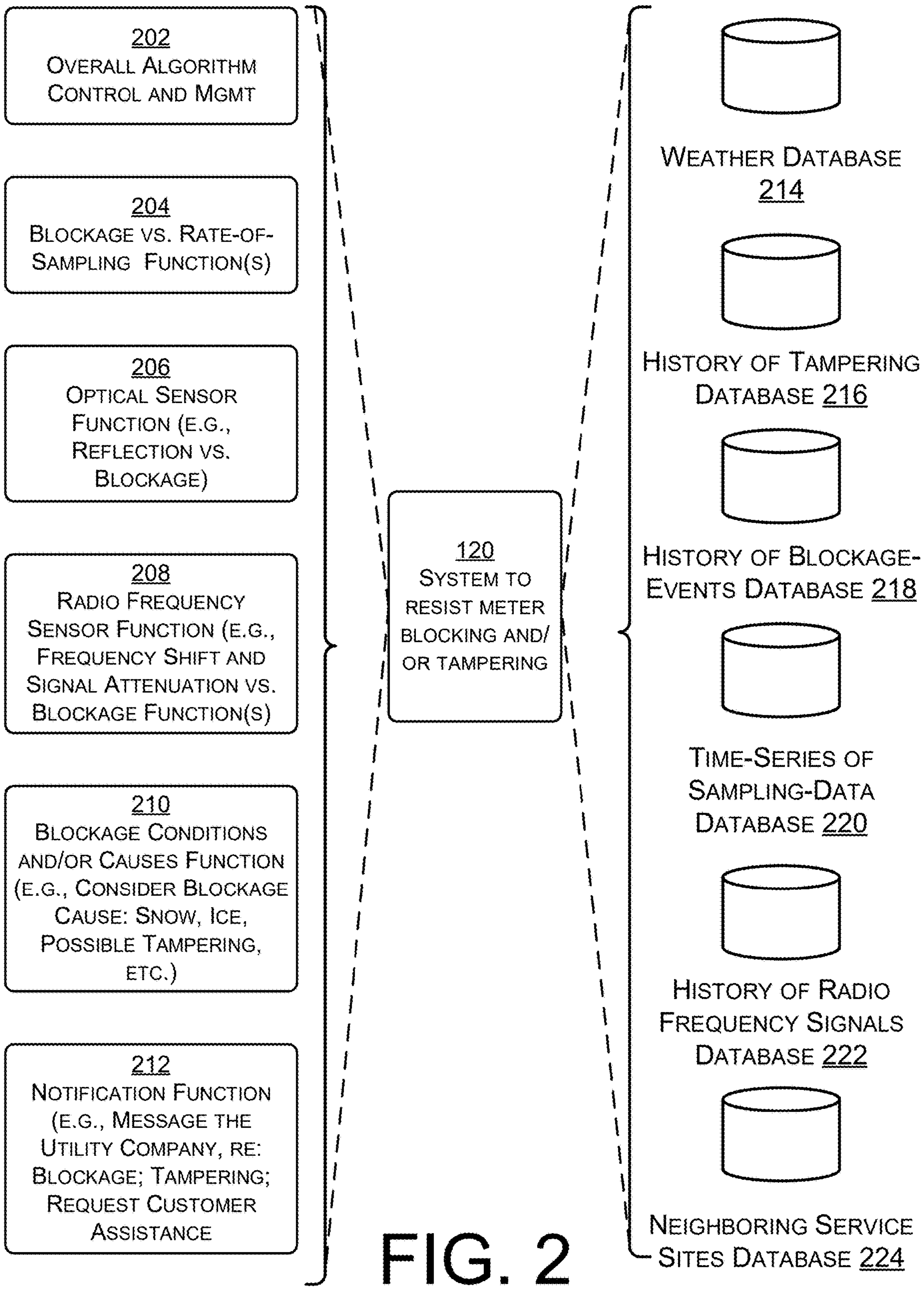
FIG. 2 is a block diagram showing an example construction of a networked device configured to detect signal blockage and tampering.

FIG. 2 shows an example of the construction of portions a networked device configured to detect signal blockage and tampering. The example shown in FIG. 2 is the system 120 to detect signal blockage and tampering of FIG. 1. The system may include a number of software subroutines that may be configured in a number of similar manners. Accordingly, FIG. 2 shows an example for illustration purposes, and includes functionality that may or may not be indicated for particular implementations.

In the example, an overall function 202 is configured for control and management of the system 120 to resist and/or detect meter signal blocking and/or tampering, which may include a number of other subroutines and databases, variables, and/or data structures.

A blockage versus rate-of-sampling function 204 is configured to increase a rate of sampling in response to detection of a significant (e.g., greater than a threshold) degree of blockage of the meter. The blockage can be snow, ice, vegetation, etc. Accordingly, during days and months wherein blockage is not a problem, the energy expended in sampling (e.g., by RF, optical, or other means) may be reduced. During days and months wherein blockage is more of a problem, the energy expended in sampling may be increased. Such sampling may detect blockage, degrees of blockage, rate of blockage increase or decrease, etc.

An optical sensor function 206 may be software configured to control the operation of optical sensors and to process, interpret, and/or manage the output of such sensors.

A radio frequency (RF) sensor function 208 is configured to use RF sensors and/or radios to monitor frequency shift and/or signal attenuation, and to use resultant data to determine likely blockage conditions, changes, and/or forecasts, etc. The sensors may monitor signal from the network(s) 104 (seen in FIG. 1) or other networked devices.

A blocking conditions and/or causes function 210 is configured to determine if the meter is experiencing blockage, and if so the cause of the blockage. In an example, extremely rapid blockage may indicate tampering (e.g., the application of aluminum foil), while slower blockage coupled with cold temperatures may indicate snow, ice, or a mixture of the two.

A notification function 212 is configured to craft a message and determine a recipient. For example, if the message is to address meter-tampering concerns, it may be sent to a utility company. If the message is to address snow and ice concerns, it may be sent to the customer, with a request to attend to the snow and ice problem. Alternatively or additionally, it may be sent to the utility company to if a service crew is needed to resolve the problem, which may include a number of customers within an area.

The system 120 to detect signal blockage and tampering may include a weather database 214, which may assist in determining if snow and/or ice are possible meter-blocking causes. The weather database 214 may include updated information on recent and/or relevant weather events. A history of tampering database 216 may include information regarding suspected and/or confirmed incidents of previous or current tampering at the customer site. This database may be maintained and/or used by the blocking conditions and/or causes function 210 and/or the notification function 212. A history of blockage-events database 218 may include information about the blockage events previously experienced by the service site, and may be maintained and/or used by one or more of the functions 202 through 212. A time-series of sampling-data database 220 may contain the sensor readings and associated times, and my contain the output of the optical sensor function 206 and/or the RF sensor function 208. A history of RF signal database 222 may contain meta data of prior RF communications, and may be a tool to help determine if current RF conditions are similar to, or worse than, past conditions. A neighboring service sites database 224 may contain data regarding neighboring smart meters and their snow, ice, and communications situations. In an example, tampering is less likely if a number of customer sites have communications problems at approximately the same time.

Example Methods

In some examples, the techniques discussed herein may be implemented by one more processors accessing software defined on one or more memory devices. The processor(s) and memory device(s) may be located on an electricity meter and/or a cloud-based server (e.g., a server of a utility company). If the functionality is distributed, software may reside on both the electricity meter and the server.

In other examples of the techniques discusses herein, the methods of operation may be performed by one or more application specific integrated circuits (ASIC) or may be performed by a general-purpose processor utilizing software defined in computer readable media. In the examples and techniques discussed herein, the memory device 116 may comprise computer-readable media and may take the form of volatile memory, such as random-access memory (RAM) and/or non-volatile memory, such as read only memory (ROM) or flash RAM. Computer-readable media devices include volatile and non-volatile, removable, and non-removable media implemented in any method or technology for storage of information such as computer-readable instructions, data structures, program modules, or other data for execution by one or more processors of a computing device. Examples of computer-readable media include, but are not limited to, phase-change memory (PRAM), static random-access memory (SRAM), dynamic random-access memory (DRAM), other types of random access memory (RAM), read-only memory (ROM), electrically erasable programmable read-only memory (EEPROM), programmable read-only memory (PROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media includes non-transitory media. Computer-readable media does not include transitory media, such as modulated data signals and carrier waves, and/or other information-containing signals.

Figure 3:
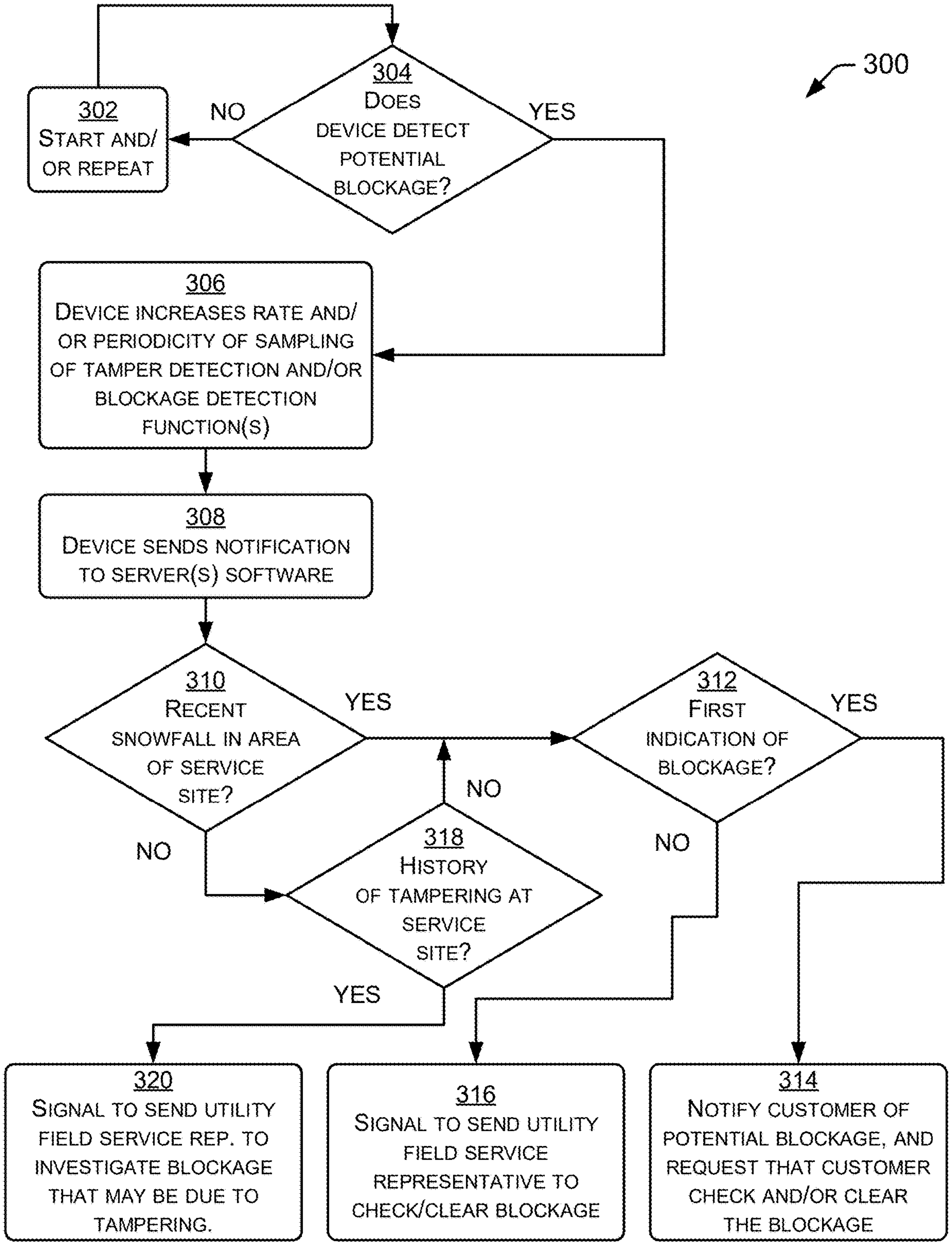
FIG. 3 is a flow diagram showing an example method to distinguish device blockage types and three example remedial actions.

FIG. 3 shows an example method 300 to distinguish device blockage types and three example remedial actions. In some examples, the actions are performed by one or more smart metering devices, such as electricity, water, or gas meters. However, the method is adaptable to other networked devices in the utility industry (e.g., switches, valves, pumps, transformers, etc.) and other industries within the internet of things, such as the transportation industry, the real property management industry, agriculture, warehousing, retailing, and many others. FIG. 3 shows how three possible outcomes may be distinguished: at block 320, a field service representative of the utility company is sent to the customer service site to investigate blockage that reasonably could be tampering; at block 316, the field service representative is sent to the customer service site to investigate blockage not thought to be tampering; and at block 314 the customer is asked to check the meter and/or remove snow, ice, foliage, etc.

At blocks 302 and 304, a loop is repeated until blockage is detected at block 304. At block 306, responsive to the detection of blockage, the device (e.g., a smart utility metering device) increases a rate and/or periodicity of sampling of tamper detection and/or blockage detection function(s). In an example, a sensor may be activated more frequently. In the example of FIG. 2, the blockage vs. rate-of-sampling function 204 may direct relevant sensors to perform a higher rate of sampling. At block 308, the device may send a notification to software operating on a server (e.g., the server(s) 102 of FIG. 1). The notification may indicate that the system 112 and/or 120 is actively investigating possible blockage and/or tampering (as opposed to looping through the detection process of blocks 302 and 304). At block 310, it is determined if there was a recent snowfall in area of service site. In an example, the weather database 214 of FIG. 2 may be consulted.

If there was a recent snowfall in the area, then at block 312 it is determined if this is the first indication of blockage. (Note: "first indication" may be replaced by less than a threshold number of indications of blockage within a period of time.) In the example of FIG. 2, the history of blockage-events database 218 may be consulted. The relevance of additional indications of blockages is that more indications of blockage tend to indicate tampering. The database 218 may indicate correspondence of: (1) blockage events with weather events (e.g., snow); and/or (2) blockage events with the blockage events of other customers at the same time. If the blockage was a first (or less than a threshold number) indication of blockage, then at block 314 the customer is notified of potential blockage and is requested to check and/or to clear the blockage.

If the blockage was not a first indication (or was more than a threshold number of indications), then at block 316 a signal or message may be sent to a utility field service representative to check and/or clear the blockage. The field service representative is sent because it is considered likely that the customer is unresponsive to requests to remove the blockage.

If at block 310 there was no recent snowfall, then at block 318 it is determined if there is a history of tampering at service site. The history may be determined by reference to the history of tampering database 216 of FIG. 2. If there is no history of tampering, at block 312 the first indication of blockage is investigated. If there is a history of tampering, then at block 320, a signal or message may be sent to a utility field service representative to investigate blockage that may be due to tampering.

Figure 4:
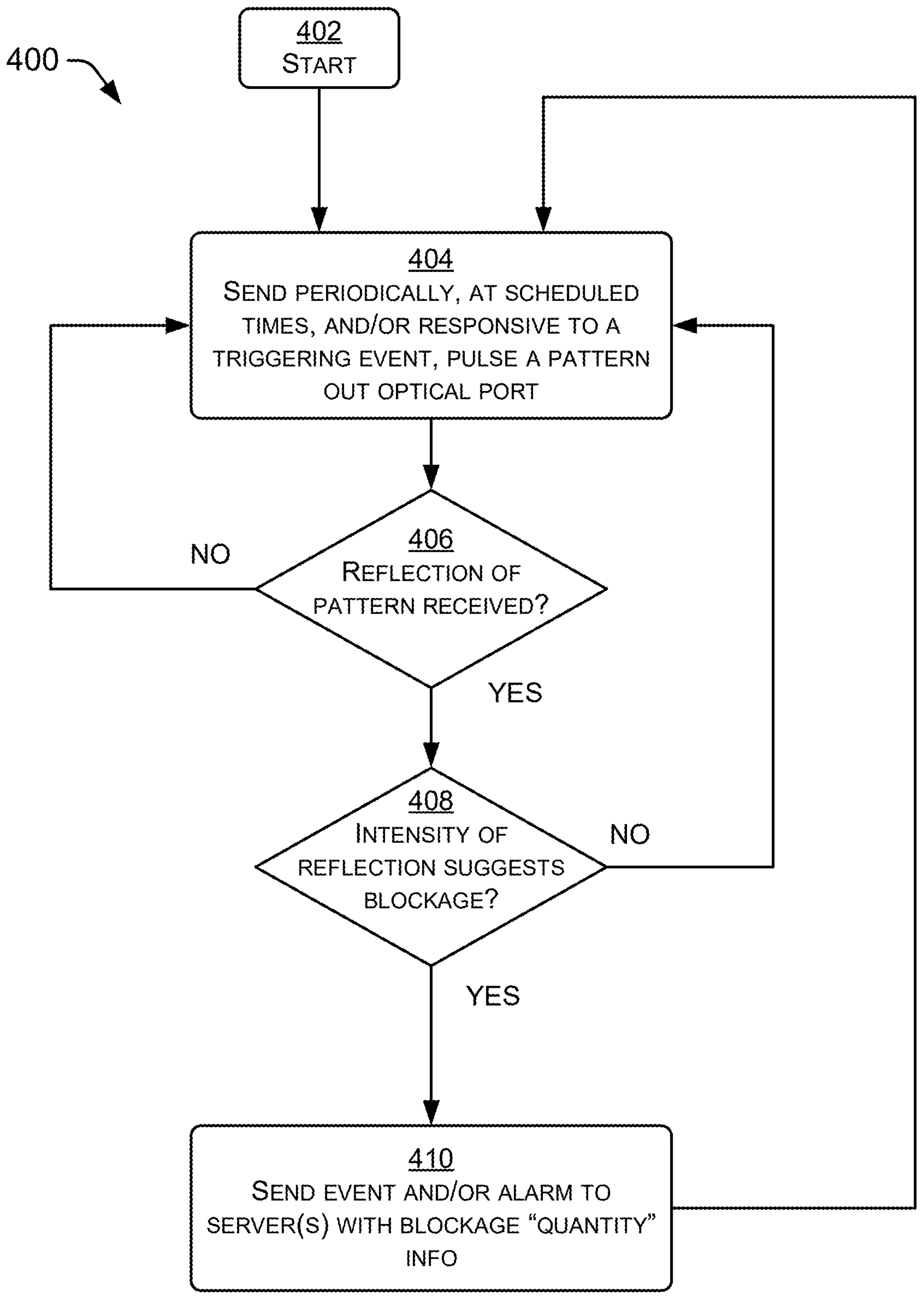
FIG. 4 is a flow diagram showing an example method by which an optical sensor and associated signal processing can be used to identify blockage conditions.

FIG. 4 shows an example method 400 by which an optical sensor and associated signal processing can be used to identify blockage conditions. In one example, an optical signal is sent, and the refection is processed to determine blockage. At block 402, periodically, randomly, at scheduled times, and/or responsive to a triggering event, a signal is sent from optical port. In an example, the signal may be any emission that will cause a reflection if there is blockage in a position to cause the reflection. At block 406, it is determined if a reflection is received. If not, block 404 is repeated. Failure to receive a reflection could indicate that the out-going pulse pattern or signal was not reflected by blockage, and simply continued outwardly from the enclosure of the meter. However, if a reflection is received, at block 408 it is determined if the intensity of the reflection suggests blockage. If blockage is not suggested, block 404 is repeated. If blockage is suggested, at block 410, an event signal and/or alarm signal is sent to a device (e.g., server(s) 102 of FIG. 1). The signal may indicate some "quantity" or other information, such as a degree to which the device is blocked, the nature of the blockage material (e.g., snow, ice, foliage, aluminum foil, etc.). Having sent a warning message, the actions of block 404 are performed.

Figure 5:
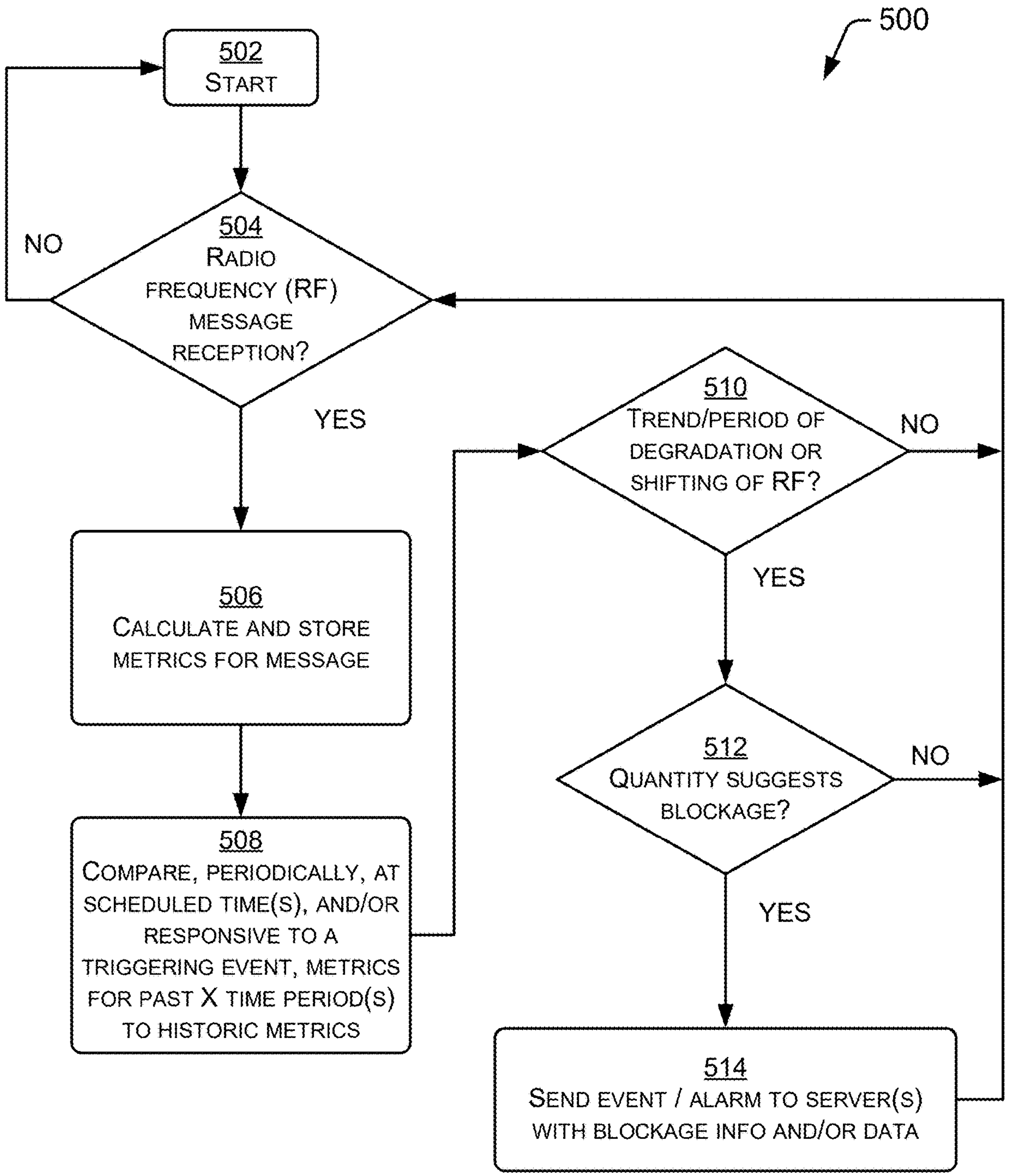
FIG. 5 is a flow diagram showing an example method by which radio frequency (RF) devices and associated signal processing can be used to identify blockage conditions.

FIG. 5 shows an example method 500 by which a radio frequency (RF) devices and associated signal processing can be used to identify blockage conditions. At blocks 502 and 504, a loop is repeated until a radio frequency (RF) message is received. At block 506, upon reception, metrics for the message are calculated and stored. Metrics can include the frequency and/or the received signal strength indicator (RSSI). At block 508, periodically, at scheduled time(s), and/or responsive to a triggering event, metrics for past number of time period(s) are compared to historic metrics. At block 510, it is determined if a trend and/or period of signal degradation or radio frequency shifting is present. A shifting frequency can indicate a snow or ice covering of the meter. Signal degradation may include reduced received signal strength indicator (RSSI), more bit errors detected (e.g., if the receiver has bit error detection and/or correction capability). At block 512, it is determined if a quantity of the shift in frequency suggests blockage of the meter. For example, if the shift is greater than a threshold, or not within a range of frequencies, then blockage may be suggested, and/or the degree of blockage suggested and/or determinable. At block 514, if blockage is present, then an event notification and/or an alarm is sent to server(s) 102 of FIG. 1. In some examples, additional data is sent.

Figure 6:
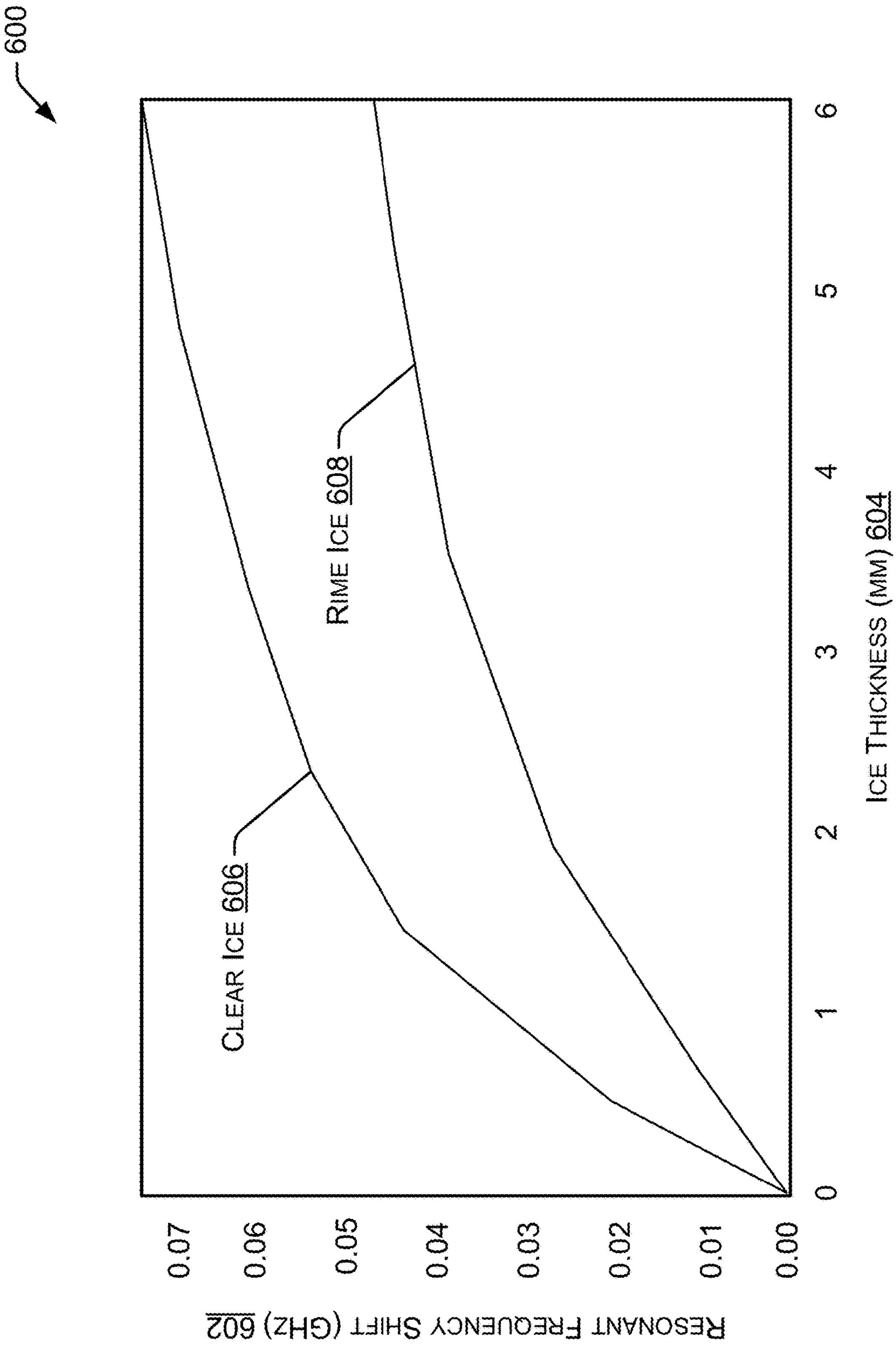
FIG. 6 is a graph showing relationships between an RF frequency shift and thicknesses of different types of ice.

FIG. 6 shows relationships 600 between an RF frequency shift and thicknesses of different types of ice. In the example relationships 600, an increase in the resonant frequency shift 602 (e.g., in GHz) is associated with an increase in the thickness of ice 604. In example of relationships 600, an increase in the thickness of clear ice 606, and rime ice 608, both result in a resonant frequency shift. That is, the build-up of ice on a device changes the frequency of radio waves passing through the ice. This change can be used to determine the ice thickness. In an example, clear ice 606 and rime ice 608 can be distinguished using the optical techniques described in FIG. 4.

Figure 7:
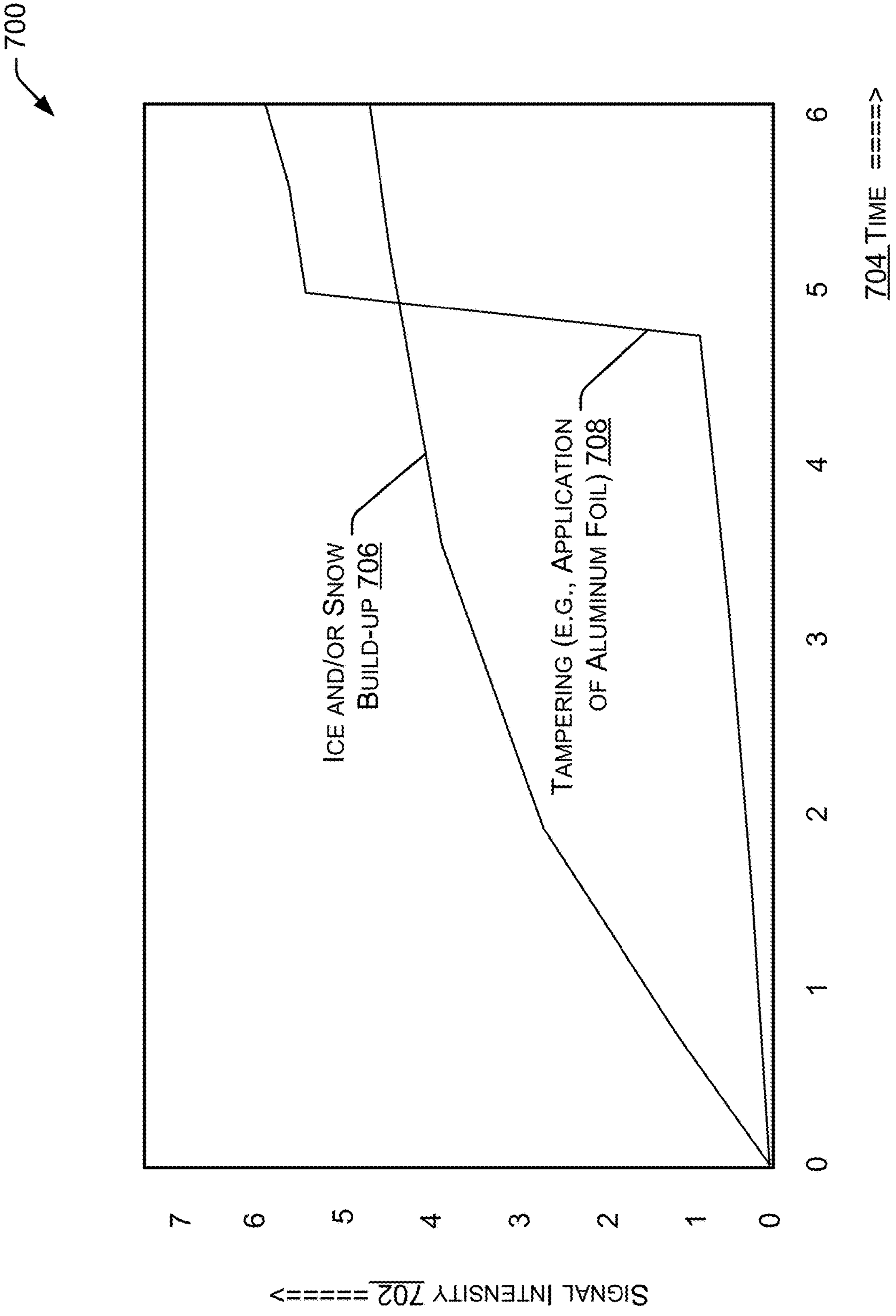
FIG. 7 is a graph showing relationships between reflected optical signal intensity and a duration in time over which different types of blockage are built up.

FIG. 7 shows relationships 700 between reflected optical signal intensity 702 and a duration of time 704 over which different types of blockage are built up on the horizontal axis. The build-up of ice and/or snow 706 is generally gradual. In contrast, the loss of signal intensity due to tampering 708 is much more rapid. Accordingly, the duration signal degradation is experienced may indicate natural causes (e.g., built-up ice and/or snow 706) versus intentional actions (e.g., tampering 708). In the case of an incoming radio frequency (RF) signal, if the blockage increases over time, the signal intensity decreases. That is, the RSSI of an incoming RF signal received from a remote communicating device decreases as blockage builds up. Accordingly, for an incoming RF signal, the vertical axis 702 indicates inverse signal intensity.

Using optical transmitters and receivers, a reflection is received responsive to optical pulses or other emissions. The nature of the optical emissions is less critical because every pulse or emission should (approximately) elicit a matching reflection. If the test is performed periodically or occasionally, an increase in blockage will result in an increase in the reflection as well (in the case of ice for example). If the reflection goes from low to high with very little transitional increase, then it could be deduced that the blockage is due to application of a material such as aluminum foil.

Figure 8:
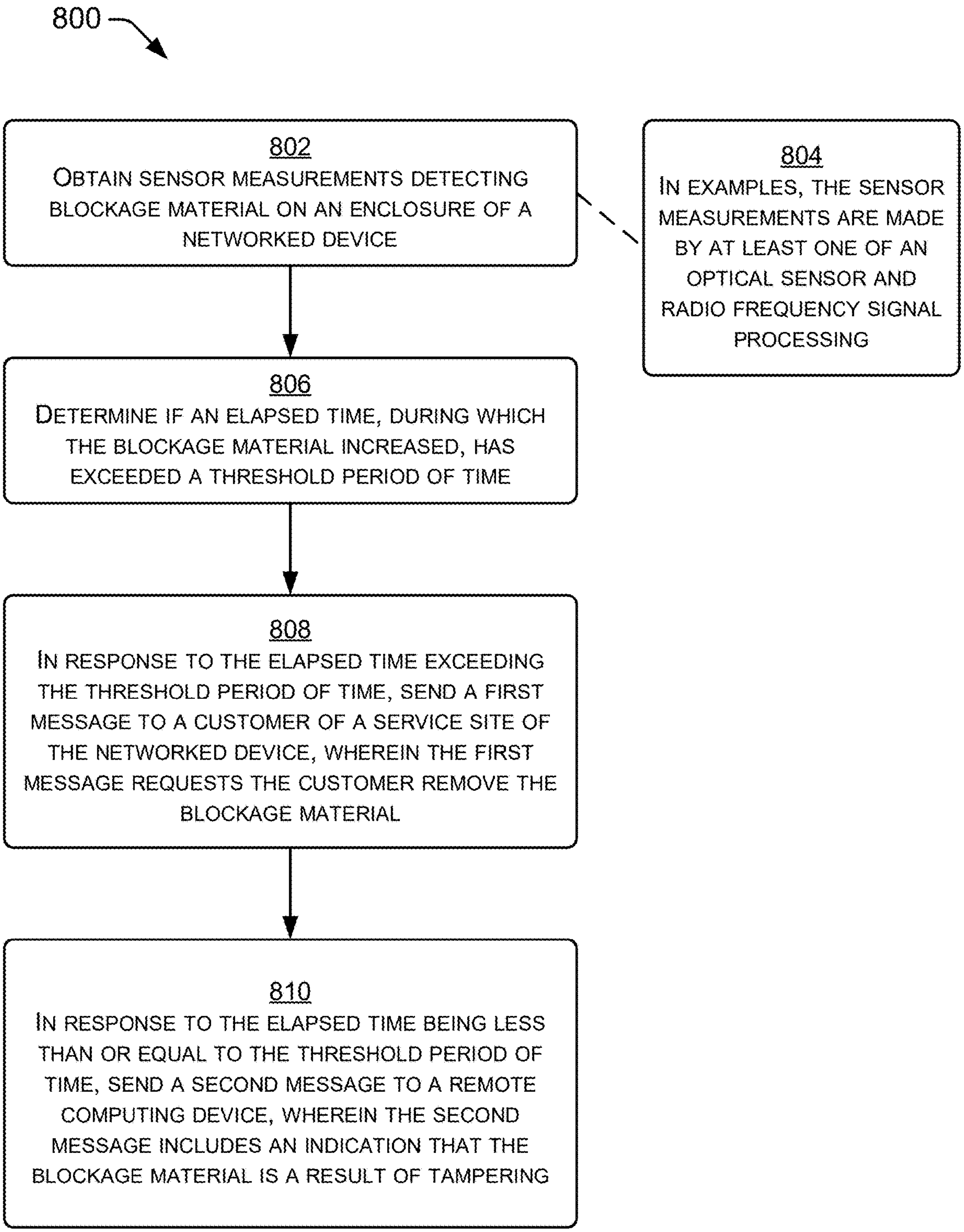
FIG. 8 is a flow diagram showing an example method for distinguishing snow, ice, and/or vegetation blockage of a networked device from tampering by a bad actor.

FIG. 8 shows an example method 800 for distinguishing snow, ice, and/or vegetation blockage of a networked device from tampering by a bad actor. At block 802, sensor measurements detecting blockage material on an enclosure of a networked device are obtained. In representative examples, at block 804 the sensor measurements may be made by at least one of: an optical sensor; and/or, radio frequency signal processing. At block 806, it is determined if an elapsed time, during which the blockage material increased, has exceeded a threshold period of time. At block 808, in response to the elapsed time exceeding the threshold period of time, a first message is sent by the networked device to a customer of a service site of the networked device. In an example, the first message requests the customer remove the blockage material. At block 810, in response to the elapsed time being less than or equal to the threshold period of time, a second message is sent to a remote computing device. The second message (different from the first message) includes an indication that the blockage material may be a result of a rapid action, such as tampering.

Figure 9:
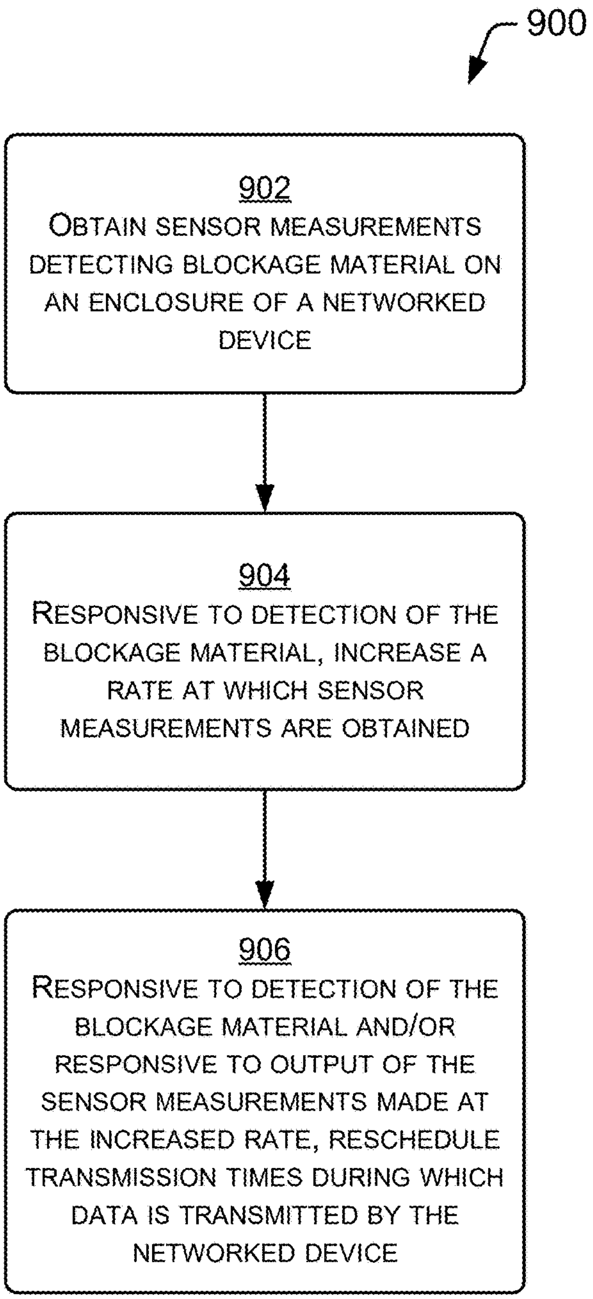
FIG. 9 is a flow diagram showing a first example method for responding to sensor measurements detecting blockage of the networked device.

FIG. 9 shows a first example method 900 for responding to sensor measurements detecting blockage of the networked device. At block 902, sensor measurements that detect blockage material on an enclosure of a networked device are obtained. At block 904, responsive to detection of the blockage material, a rate at which sensor measurements are obtained is increased. At block 906, responsive to detection of the blockage material—and/or responsive to output based on the increased rate of sensor measurements—transmission time(s) during which data is transmitted by the networked device are rescheduled.

Figure 10:
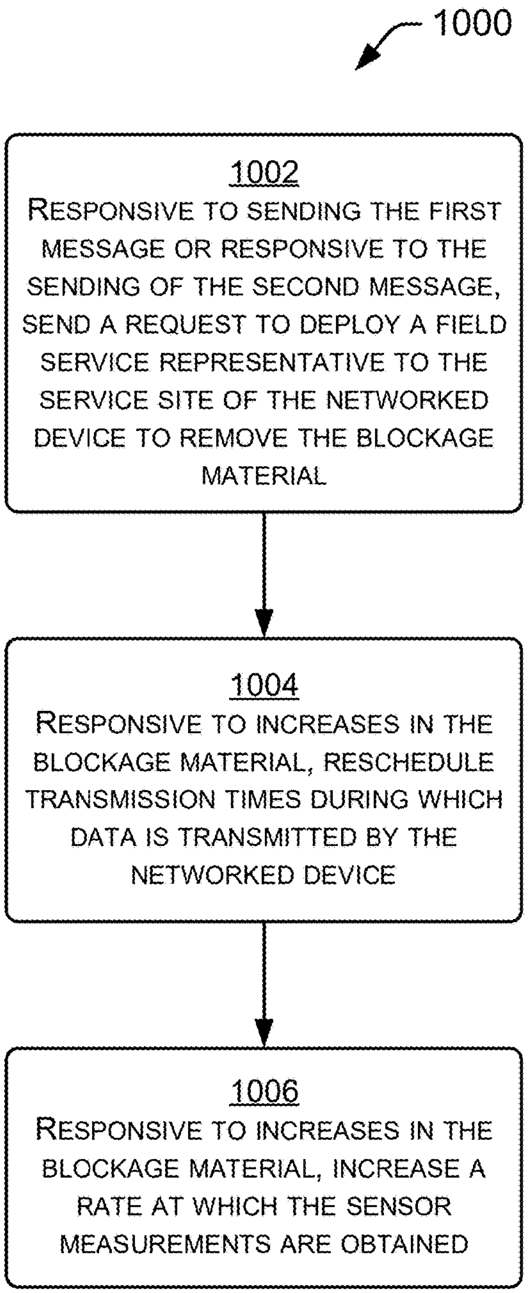
FIG. 10 is a flow diagram showing a second example method for responding to sensor measurements detecting blockage of the networked device.

FIG. 10 shows a second example method 1000 for responding to sensor measurements detecting blockage of the networked device. At block 1002, responsive to sending the first message or responsive to sending the second message, a request is sent to deploy a field service representative to the service site of the networked device to remove the blockage material. At block 1004, responsive to increases in the blockage material, transmission times during which data is transmitted by the networked device are rescheduled. At block 1006, responsive to increases in the blockage material, a rate at which the sensor measurements are obtained is increased.

Figure 11:
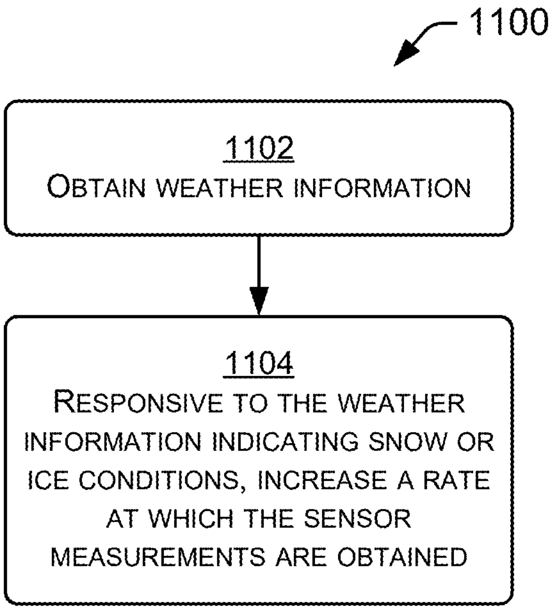
FIG. 11 is a flow diagram showing a first example method for responding to weather information.

FIG. 11 shows a first example method 1100 for responding to weather information. At block 1102, weather information is obtained. At block 1104, responsive to weather information indicating snow or ice conditions, a rate at which the sensor measurements are made and/or obtained is increased. In an example, a change in the weather, such as snowfall, may trigger the increased rate of sensor measurements.

Figure 12:
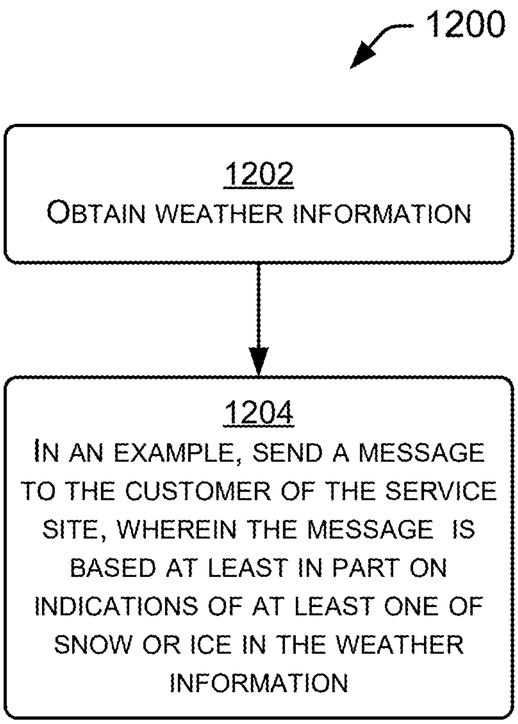
FIG. 12 is a flow diagram showing a second example method for responding to weather information.

FIG. 12 shows a second example method 1200 for responding to weather information. At block 1202, weather information is obtained. At block 1204, the message sent to the customer of the service site is based at least in part on indications of at least one of snow or ice in the weather information. In an example, in response to severe weather conditions, customers may be asked to keep their meters clear of snow, ice, and debris.

Figure 13:
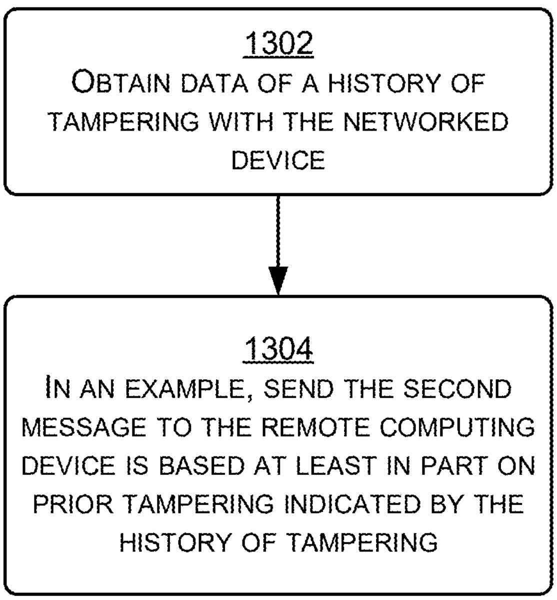
FIG. 13 is a flow diagram showing an example method for utilizing past tampering information.

FIG. 13 shows an example method 1300 for utilizing past tampering information. At block 1302, data indicating a possible history of tampering with the networked device is obtained. At block 1304, a message is sent to the remote computing device based at least in part on prior tampering indicated by the history of tampering. In the example of block 320 of FIG. 3, the message or signal to the utility company indicates that blockage may be due to tampering by the customer of the service site.

Figure 14:
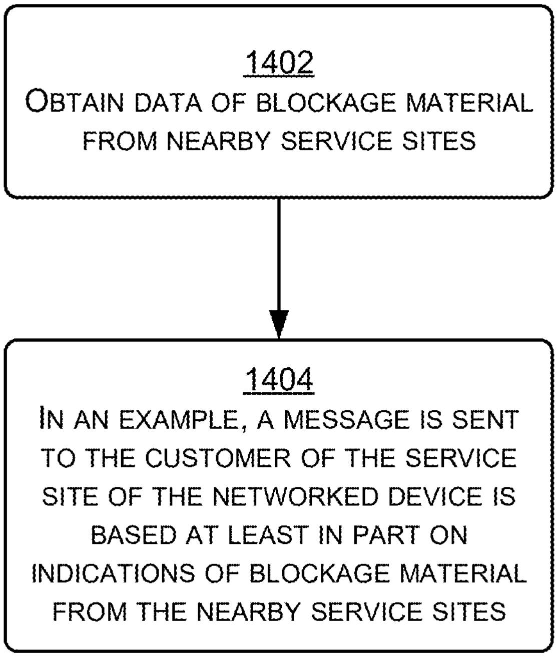
FIG. 14 is a flow diagram showing an example method for utilizing indications of blockage material at nearby service sites.

FIG. 14 shows an example method 1400 for utilizing indications of blockage material at nearby service sites. In an example, the blockage of nearby service sites may indicate that snow or ice has affected a number of metering devices in a geographic area. At block 1402, data regarding blockage material at nearby service sites is received from those sites. The number of nearby service sites tends to support the belief that weather caused the blockage. At block 1404, a message is sent to customer(s) of service site(s) based at least in part on indications of blockage material from the nearby service sites. In the example of block 314 of FIG. 3, the message or signal to the customer indicates the likelihood of blockage and requests help from the customer to clear the blockage.

Figure 15:
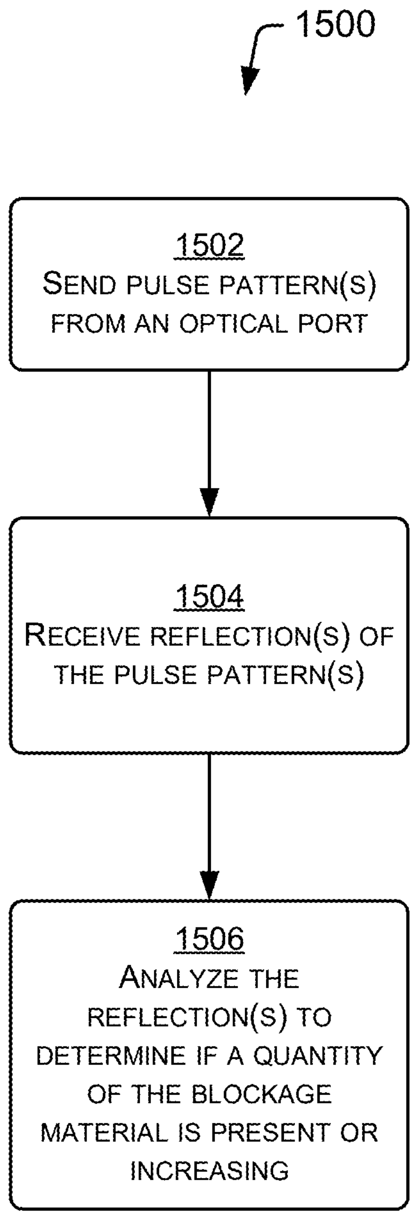
FIG. 15 is a flow diagram showing a first example method for utilizing optical sensors to analyze blockage material.

FIG. 15 shows a first example method 1500 for utilizing optical sensors to analyze blockage material. In an example: an optical signal (e.g., a pulse pattern, signal, emission, etc.) is sent toward a transparent cover of the metering device; the signal is reflected by blockage (e.g., debris) on the cover; and the reflection is analyzed to determine characteristics of the blockage material, such as its extent, thickness, quantity, composition, etc. At block 1502, a pulse (e.g., an emission) is sent from an optical port. At block 1504, a reflection of the pulse pattern (e.g., reflecting off the blockage material on the transparent cover of the meter) is received. At block 1506, the reflection is analyzed to determine if a quantity of the blockage material is present or if the quantity is increasing.

Figure 16:
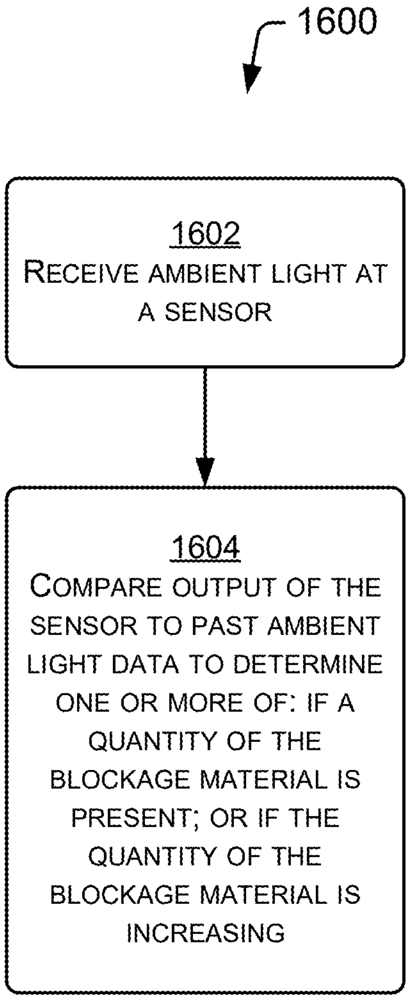
FIG. 16 is a flow diagram showing a second example method for utilizing optical sensors to analyze blockage material.

FIG. 16 shows a second example method 1600 for utilizing optical sensors to analyze blockage material. At block 1602, ambient light is received at an optical sensor. At block 1604, output of the sensor is compared to past ambient light data to determine one or more of: if a quantity of the blockage material is present; or if the quantity of the blockage material is increasing.

Figure 17:
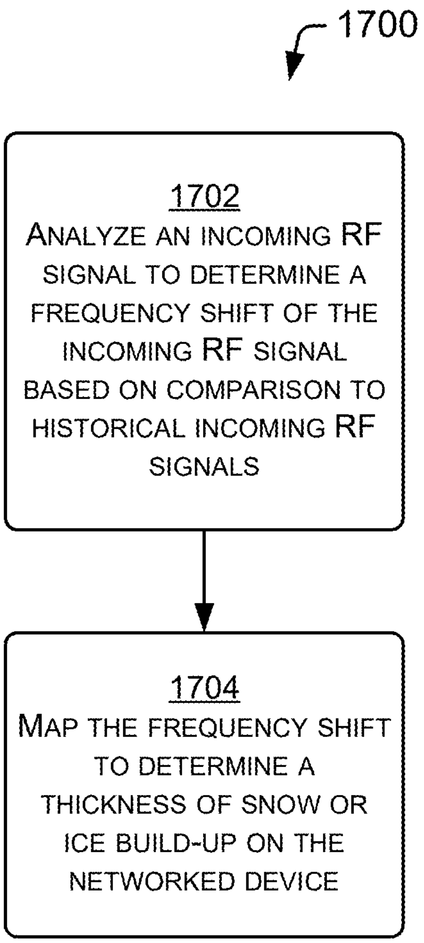
FIG. 17 is a flow diagram showing a first example method for utilizing radio frequency sensors to analyze blockage material based on RF frequency shift.

FIG. 17 shows a first example method 1700 for utilizing radio frequency sensors to analyze blockage material. At block 1702, an incoming RF signal is analyzed to determine if the signal has shifted frequency (e.g., caused by blockage material). The frequency-shift may be based on comparison of the frequency of the signal to the frequency of historical incoming RF signals. At block 1704, the frequency shift is mapped to determine a thickness of snow or ice build-up on the networked device. That is, a "mapping" or function associates different frequency shifts with respective thicknesses of snow and/or ice.

Figure 18:
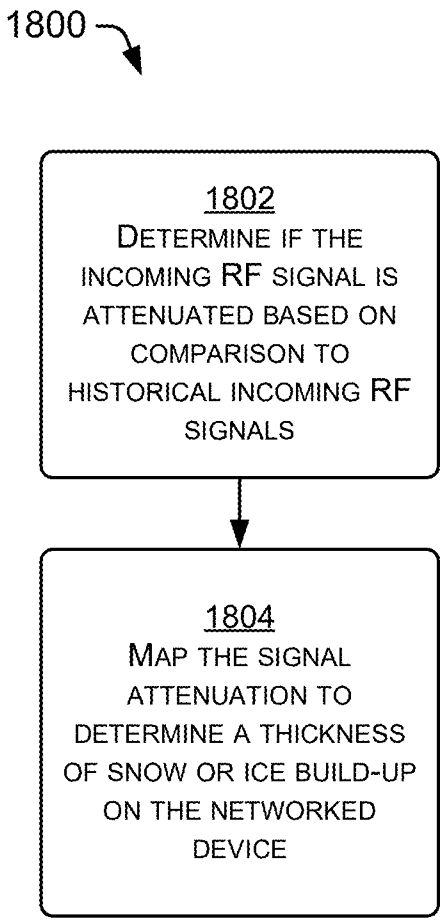
FIG. 18 is a flow diagram showing a second example method for utilizing RF sensors to analyze blockage material based on RF signal attenuation.

FIG. 18 shows a second example method 1800 for utilizing radio frequency sensors to analyze signal attenuation caused by blockage material. Additionally, the signal attenuation may be mapped and/or associated with various characteristics of the blockage material. At block 1802, the incoming RF signal is analyzed to determine if it is attenuated based on comparison to historical incoming RF signals. At block 1804, the signal attenuation is mapped to determine a thickness of snow or ice build-up on the networked device. That is, a "mapping" or function associates different signal attenuations with respective thicknesses of snow and/or ice.

Example Systems, Devices, and Methods

The following examples of a networked device configured to detect signal blockage and tampering are expressed as numbered clauses. While the examples illustrate a number of possible configurations and techniques, they are not meant to be an exhaustive listing of the systems, methods, and/or techniques described herein.

1. A method, comprising: obtaining sensor measurements detecting blockage material on an enclosure of a networked device; determining if an elapsed time, during which the blockage material increased, has exceeded a threshold period of time; responsive to the elapsed time exceeding the threshold period of time, sending a first message to a customer of a service site of the networked device, wherein the first message requests the customer remove the blockage material; and responsive to the elapsed time being less than or equal to the threshold period of time, sending a second message to a remote computing device, wherein the second message includes an indication that the blockage material is a result of tampering.
2. The method of clause 1, wherein the networked device comprises one or more of: a gas meter; a gas regulator; or a solar battery access point.
3. The method of clause 1, additionally comprising: responsive to sending the first message or responsive to sending the second message, sending a request to deploy a field service representative to the service site of the networked device to remove the blockage material.
4. The method of clause 1, additionally comprising: responsive to detection of the blockage material, rescheduling transmission times during which data is transmitted by the networked device.
5. The method of clause 1, additionally comprising: responsive to detection of the blockage material, increasing a rate at which sensor measurements are obtained; wherein the sensor measurements are made by at least one of an optical sensor and radio frequency signal processing.
6. The method of clause 1, additionally comprising: obtaining weather information; and responsive to indications of snow or ice conditions in the weather information, increasing a rate at which the sensor measurements are obtained.
7. The method of clause 1, additionally comprising: obtaining weather information; and wherein sending the first message to the customer of the service site of the networked device is based at least in part on indications of at least one of snow or ice in the weather information.
8. The method of clause 1, additionally comprising: obtaining data of a history of tampering with the networked device; and wherein sending the second message to the remote computing device is based at least in part on prior tampering indicated by the history of tampering.

9. The method of clause 1, additionally comprising: obtaining data from a nearby service site indicating blockage material at the nearby service site; wherein sending the first message to the customer of the service site of the networked device is based at least in part on indications of blockage material from the nearby service site.

10. The method of clause 1, wherein obtaining the sensor measurements comprises: sending pulse patterns from an optical port; receiving reflections of the pulse patterns; and analyzing the reflections to determine one or more of: if a quantity of the blockage material is present; or if the quantity of the blockage material is increasing.

11. The method of clause 1, wherein obtaining the sensor measurements comprises: receiving ambient light at a sensor; comparing output of the sensor to past ambient light data to determine one or more of: if a quantity of the blockage material is present; or if the quantity of the blockage material is increasing.

12. The method of clause 1, wherein obtaining the sensor measurements comprises: analyzing an incoming RF signal to determine if the incoming RF signal is attenuated based on comparison to historical incoming RF signals; wherein the first message is sent based at least in part on the analyzing.

13. The method of clause 1, wherein obtaining the sensor measurements comprises: analyzing an incoming RF signal to determine if a frequency of the incoming RF signal is shifted based on comparison to a history of incoming RF signals; wherein the first message is sent based at least in part on the analyzing.

14. The method of clause 1, wherein obtaining the sensor measurements comprises: analyzing an incoming RF signal to determine a frequency shift of the incoming RF signal based on comparison to historical incoming RF signals; mapping the frequency shift to determine a thickness of snow or ice build-up on the networked device.

The method of clause 1, additionally comprising one, or more, or all, of the preceding clauses.

15. A networked device, comprising: a processor; one or more memory devices in communication with the processor; statements, defined in the one or more memory devices, which when executed by the processor to perform actions comprising: obtaining a sensor measurement detecting a blockage material on an enclosure of the networked device; responsive detection of the blockage material, increasing a rate at which sensor measurements are obtained; and responsive detection of the blockage material, rescheduling transmission times during which data is transmitted by the networked device.

16. The networked device of clause 15, wherein the actions additionally comprise: determining if an elapsed time, during which the blockage material increased, has exceeded a threshold period of time; responsive to the elapsed time exceeding the threshold period of time, sending a first message to a customer of a service site of the networked device, wherein the first message requests the customer remove the blockage material; and responsive to the elapsed time being less than or equal to the threshold period of time, sending a second message to a remote computing device, wherein the second message includes an indication that the blockage material is a result of tampering.

17. The networked device of clause 15, wherein the actions additionally comprise: obtaining weather information; and sending a message to a customer of a service site of the networked device is based at least in part on indications of sub-freezing conditions in the weather information.

18. The networked device of clause 15, wherein the actions additionally comprise: obtaining data from a nearby service site indicating blockage material at the nearby service site; and sending a message to a customer of a service site of the networked device, wherein the sending is based at least in part on the blockage material detected on the enclosure of the networked device, wherein the sending is based at least in part on indications of blockage material from the nearby service site, and wherein the message requests the customer remove the blockage material.

19. The networked device of clause 15, wherein obtaining the sensor measurement comprises: sending a signal from an optical port; receiving a reflection of the signal; determining an intensity of the reflection; and estimating a degree to which the networked device is blocked based on the intensity.

20. The networked device of clause 15, wherein obtaining the sensor measurement comprises: analyzing an incoming RF signal to determine if the incoming RF signal is attenuated based on comparison to historical incoming RF signals.

The networked device of clause 15, additionally comprising one, or more, or all, of the preceding clauses.

21. One or more non-transitory computer-readable media storing computer-executable instructions that, when executed by one or more processors, configure a computing device to perform actions comprising: obtaining a sensor measurement detecting a blockage material on an enclosure of a networked device; responsive to detection of the blockage material, increasing a rate at which sensor measurements are obtained; and responsive to detection of the blockage material, rescheduling transmission times during which data is transmitted by the networked device.

22. The one or more non-transitory computer-readable media of clause 21, wherein the actions additionally comprise: determining if an elapsed time, during which the blockage material increased, has exceeded a threshold period of time; responsive to the elapsed time exceeding the threshold period of time, sending a first message to a customer of a service site of the networked device, wherein the first message requests the customer remove the blockage material; and responsive to the elapsed time being less than or equal to the threshold period of time, sending a second message to a remote computing device, wherein the second message includes an indication that the blockage material is a result of tampering.

23. The one or more non-transitory computer-readable media of clause 21, wherein the actions additionally comprise: obtaining weather information; and sending a message to a customer of a service site of the networked device is based at least in part on indications of sub-freezing conditions in the weather information.

24. The one or more non-transitory computer-readable media of clause 21, wherein the actions additionally comprise: obtaining data from a nearby service site indicating blockage material at the nearby service site;

and sending a message to a customer of a service site of the networked device, wherein the sending is based at least in part on the blockage material detected on the enclosure of the networked device, wherein the sending is based at least in part on indications of blockage material from the nearby service site, and wherein the message requests the customer remove the blockage material.

25. The one or more non-transitory computer-readable media of clause 21, wherein the actions additionally comprise: sending a signal from an optical port; receiving a reflection of the signal; determining an intensity of the reflection; and estimating a degree to which the networked device is blocked based on the intensity.

26. The one or more non-transitory computer-readable media of clause 21, wherein obtaining the sensor measurement comprises: analyzing an incoming RF signal to determine if the incoming RF signal is attenuated based on comparison to historical incoming RF signals.

The one or more non-transitory computer-readable media of clause 21, additionally comprising one, or more, or all, of the preceding clauses.

Conclusion

Although the subject matter has been described in language specific to structural features and/or methodological actions, it is to be understood that the subject matter defined in the appended claims is not necessarily limited to the specific features or actions described. Rather, the specific features and actions are disclosed as exemplary forms of implementing the claims.

The words comprise, comprises, and/or comprising, when used in this specification and/or claims do not preclude the presence or addition of one or more other features, devices, techniques, and/or components and/or groups thereof.

What is claimed is:

1. A method, comprising:

obtaining sensor measurements detecting blockage material on an enclosure of a networked device;

determining if an elapsed time, during which the blockage material increased, has exceeded a threshold period of time;

responsive to the elapsed time exceeding the threshold period of time, sending a first message to a customer of a service site of the networked device, wherein the first message requests the customer remove the blockage material; and responsive to the elapsed time being less than or equal to the threshold period of time, sending a second message to a remote computing device, wherein the second message includes an indication that the blockage material is a result of tampering.

2. The method of claim 1, wherein the networked device comprises one or more of:

a gas meter;

a gas regulator; or a solar battery access point.

3. The method of claim 1, additionally comprising:

responsive to sending the first message or responsive to sending the second message, sending a request to deploy a field service representative to the service site of the networked device to remove the blockage material.

4. The method of claim 1, additionally comprising:

responsive to detection of the blockage material, rescheduling transmission times during which data is transmitted by the networked device.

5. The method of claim 1, additionally comprising:

responsive to detection of the blockage material, increasing a rate at which sensor measurements are obtained;

wherein the sensor measurements are made by at least one of an optical sensor and radio frequency signal processing.

6. The method of claim 1, additionally comprising:

obtaining weather information; and responsive to indications of snow or ice conditions in the weather information, increasing a rate at which the sensor measurements are obtained.

7. The method of claim 1, additionally comprising:

obtaining weather information; and wherein sending the first message to the customer of the service site of the networked device is based at least in part on indications of at least one of snow or ice in the weather information.

8. The method of claim 1, additionally comprising:

obtaining data of a history of tampering with the networked device; and wherein sending the second message to the remote computing device is based at least in part on prior tampering indicated by the history of tampering.

9. The method of claim 1, additionally comprising:

obtaining data from a nearby service site indicating blockage material at the nearby service site;

wherein sending the first message to the customer of the service site of the networked device is based at least in part on indications of blockage material from the nearby service site.

10. The method of claim 1, wherein obtaining the sensor measurements comprises:

sending pulse patterns from an optical port;

receiving reflections of the pulse patterns; and analyzing the reflections to determine one or more of:

if a quantity of the blockage material is present; or if the quantity of the blockage material is increasing.

11. The method of claim 1, wherein obtaining the sensor measurements comprises:

receiving ambient light at a sensor;

comparing output of the sensor to past ambient light data to determine one or more of: if a quantity of the blockage material is present; or if the quantity of the blockage material is increasing.

12. The method of claim 1, wherein obtaining the sensor measurements comprises:

analyzing an incoming RF signal to determine if the incoming RF signal is attenuated based on comparison to historical incoming RF signals;

wherein the first message is sent based at least in part on the analyzing.

13. The method of claim 1, wherein obtaining the sensor measurements comprises:

analyzing an incoming RF signal to determine if a frequency of the incoming RF signal is shifted based on comparison to a history of incoming RF signals;

wherein the first message is sent based at least in part on the analyzing.

14. The method of claim 1, wherein obtaining the sensor measurements comprises:

analyzing an incoming RF signal to determine a frequency shift of the incoming RF signal based on comparison to historical incoming RF signals;

mapping the frequency shift to determine a thickness of snow or ice build-up on the networked device.

15. A networked device, comprising:

a processor;

one or more memory devices in communication with the processor;

statements, defined in the one or more memory devices, which when executed by the processor to perform actions comprising:

obtaining a sensor measurement detecting a blockage material on an enclosure of the networked device;

responsive detection of the blockage material, increasing a rate at which sensor measurements are obtained; and responsive detection of the blockage material, rescheduling transmission times during which data is transmitted by the networked device.

16. The networked device of claim 15, wherein the actions additionally comprise:

determining if an elapsed time, during which the blockage material increased, has exceeded a threshold period of time;

responsive to the elapsed time exceeding the threshold period of time, sending a first message to a customer of a service site of the networked device, wherein the first message requests the customer remove the blockage material; and responsive to the elapsed time being less than or equal to the threshold period of time, sending a second message to a remote computing device, wherein the second message includes an indication that the blockage material is a result of tampering.

17. The networked device of claim 15, wherein the actions additionally comprise:

obtaining weather information; and sending a message to a customer of a service site of the networked device is based at least in part on indications of sub-freezing conditions in the weather information.

18. The networked device of claim 15, wherein the actions additionally comprise:

obtaining data from a nearby service site indicating blockage material at the nearby service site; and sending a message to a customer of a service site of the networked device, wherein the sending is based at least in part on the blockage material detected on the enclosure of the networked device, wherein the sending is based at least in part on indications of blockage material from the nearby service site, and wherein the message requests the customer remove the blockage material.

19. The networked device of claim 15, wherein obtaining the sensor measurement comprises:

sending a signal from an optical port;

receiving a reflection of the signal;

determining an intensity of the reflection; and estimating a degree to which the networked device is blocked based on the intensity.

20. The networked device of claim 15, wherein obtaining the sensor measurement comprises:

analyzing an incoming RF signal to determine if the incoming RF signal is attenuated based on comparison to historical incoming RF signals.

21. One or more non-transitory computer-readable media storing computer-executable instructions that, when executed by one or more processors, configure a computing device to perform actions comprising:

obtaining a sensor measurement detecting a blockage material on an enclosure of a networked device;

responsive to detection of the blockage material, increasing a rate at which sensor measurements are obtained; and responsive to detection of the blockage material, rescheduling transmission times during which data is transmitted by the networked device.

22. The one or more non-transitory computer-readable media of claim 21, wherein the actions additionally comprise:

determining if an elapsed time, during which the blockage material increased, has exceeded a threshold period of time;

responsive to the elapsed time exceeding the threshold period of time, sending a first message to a customer of a service site of the networked device, wherein the first message requests the customer remove the blockage material; and responsive to the elapsed time being less than or equal to the threshold period of time, sending a second message to a remote computing device, wherein the second message includes an indication that the blockage material is a result of tampering.

23. The one or more non-transitory computer-readable media of claim 21, wherein the actions additionally comprise:

obtaining weather information; and sending a message to a customer of a service site of the networked device is based at least in part on indications of sub-freezing conditions in the weather information.

24. The one or more non-transitory computer-readable media of claim 21, wherein the actions additionally comprise:

obtaining data from a nearby service site indicating blockage material at the nearby service site; and sending a message to a customer of a service site of the networked device, wherein the sending is based at least in part on the blockage material detected on the enclosure of the networked device, wherein the sending is based at least in part on indications of blockage material from the nearby service site, and wherein the message requests the customer remove the blockage material.

25. The one or more non-transitory computer-readable media of claim 21, wherein the actions additionally comprise:

sending a signal from an optical port;

receiving a reflection of the signal;

determining an intensity of the reflection; and estimating a degree to which the networked device is blocked based on the intensity.

26. The one or more non-transitory computer-readable media of claim 21, wherein obtaining the sensor measurement comprises:

analyzing an incoming RF signal to determine if the incoming RF signal is attenuated based on comparison to historical incoming RF signals.

* * * * *